Dec. 16, 1958    W. H. DU SHANE    2,864,295
SELECTIVE LOAD AND POSITION CONTROL FOR
AGRICULTURAL TRACTOR
Original Filed June 17, 1955    2 Sheets-Sheet 1
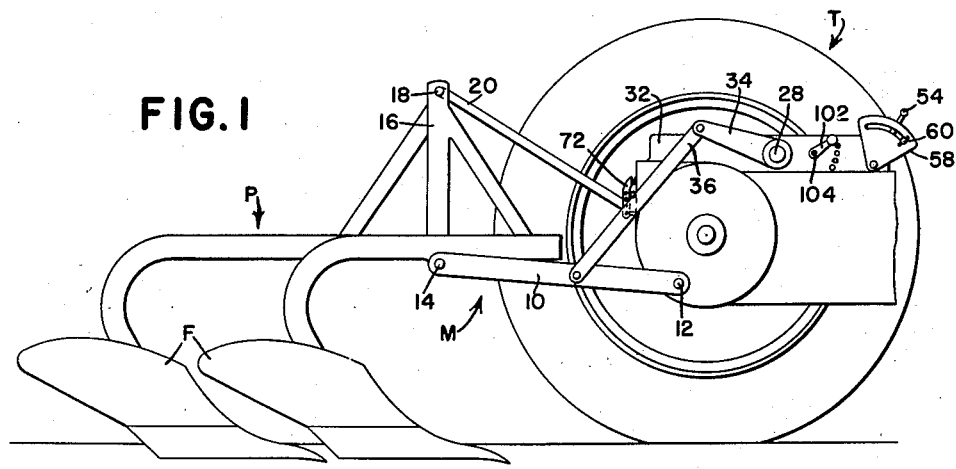
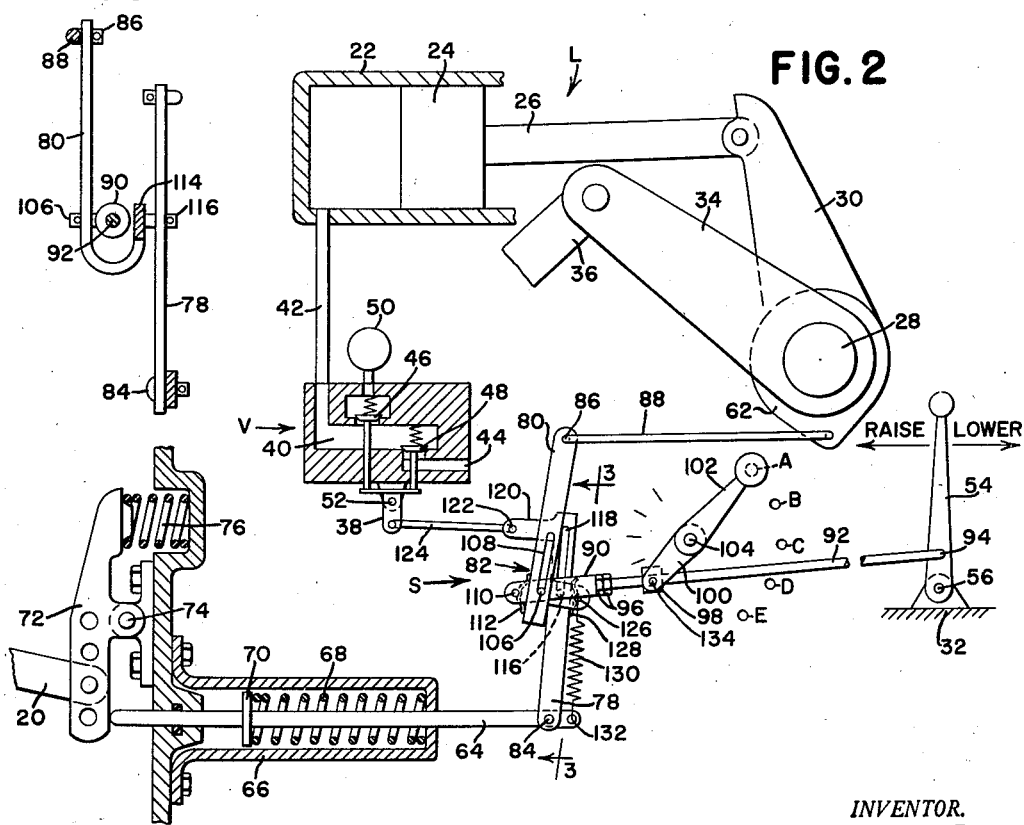
*INVENTOR.*
W. H. DuSHANE Dec. 16, 1958  W. H. DU SHANE  2,864,295
SELECTIVE LOAD AND POSITION CONTROL FOR
AGRICULTURAL TRACTOR
Original Filed June 17, 1955  2 Sheets-Sheet 2
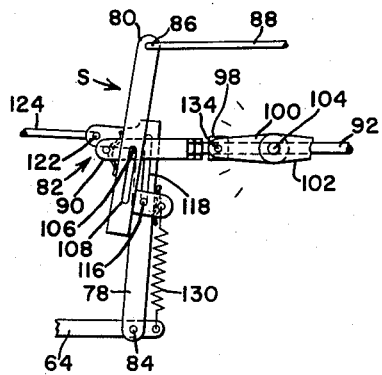
FIG. 4
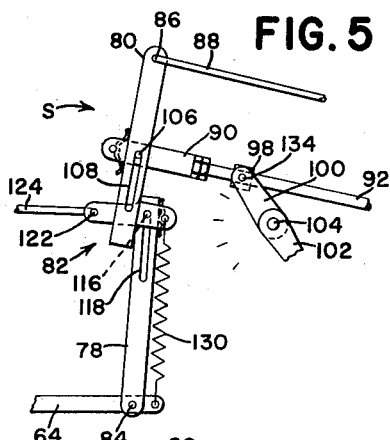
FIG. 5
FIG. 6
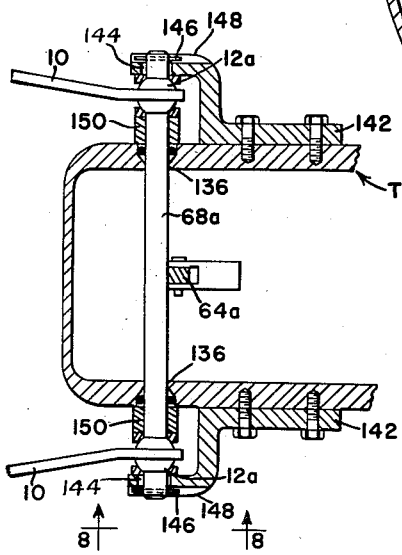
FIG. 7
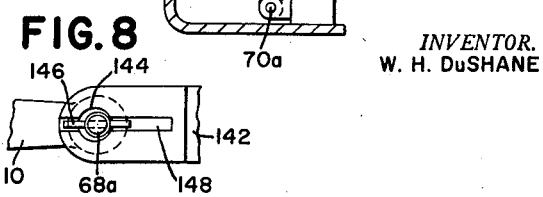
FIG. 8
*INVENTOR.*
W. H. DuSHANE United States Patent Office 2,864,295
Patented Dec. 16, 1958

2,864,295

SELECTIVE LOAD AND POSITION CONTROL FOR AGRICULTURAL TRACTOR

Wallace H. Du Shane, Waterloo, Iowa, assignor, by mesne assignments, to Deere & Company, a corporation of Delaware Continuation of application Serial No. 516,059, June 17, 1955. This application June 19, 1956, Serial No. 592,443

10 Claims. (Cl. 172—9)

This invention relates to an agricultural implement control and more particularly to a selective control for regulating the working position of an agricultural implement relative to a tractor by which the implement is drawn.

This application is a continuation of application Ser. No. 516,059, filed June 17, 1955, now abandoned.

Those familiar with the art are conversant with the so-called Ferguson load or draft control system in which the working position of a ground-working tool or similar implement is first selected by a manual control and the draft or working load on the implement is balanced against a spring so that the draft or working load remains substantially contant. The various advantages and disadvantages of a system of this type are sufficiently well known as to require no elaboration here, as is the case with the advantages and disadvantages of the so-called position control system in which the position of the manual control lever is proportional to the working depth of the implement and the working depth does not vary regardless of changes in draft load.

In at least one instance in the prior art, as represented for example by the disclosure in assignee's co-pending application Serial Number 258,231, filed November 26, 1951, now Patent 2,721,508, there has been evolved a combination of the load and position control systems so as to obtain the benefit of the advantages of both of them. In some instances, designs have been provided which afford either but not both of the systems; that is to say, the user may employ load control or position control but the design contains no provision for combining the two. According to the present invention, such combination is made possible so that a compound motion-transmitting system is available in which the implement may operate under load control exclusively, position control exclusively or a combination of both in various degrees, hereinafter sometimes referred to as the position-compensated phases of the improved system.

It is an important feature of the invention to achieve this improved system by the use of compound servo means having a plurality of elements, one of which is exclusively under the control of means movable in response to the attainment by the implement of different working positions, another of which is movable in response to changes in working load on the implement, and still another of which is movable at times by one responsive means and at other times by the other responsive means. The invention features a novel and economical design in which these and other advantages are achieved through the use of simple linkages involving variations in moment arms and fulcra, all of which, together with other features and inherent advantages, will be brought out in the following detailed description and accompanying sheet of drawings, the several figures of which will be described immediately below.

Fig. 1 is a side elevational view representing a tractor and plow.

Fig. 2 is a schematic view, partly in section, of the control system for operation at one extreme position of adjustment.

Fig. 3 is an enlarged view as seen along the line 3—3 of Fig. 2.

Fig. 4 is a view of a portion of the servo system of Fig. 2, with the parts in an intermediate position of adjustment.

Fig. 5 is a similar view showing the parts in the other extreme position of adjustment.

Fig. 6 is a schematic view of a modified form of control system.

Fig. 7 is a sectional view as seen on the line 7—7 of Fig. 6.

Fig. 8 is an elevational view as seen along the line 8—8 of Fig. 7.

The agricultural vehicle-implement outfit comprises a tractor T and a plow P, the tractor having means M for the adjustable attachment thereto of the implement or plow. The illustrated components of the outfit are representative only, the plow being chosen because it is a good example of an implement on which draft or load values will change according to such factors as density of the soil, changes in the level of the terrain, etc. Any other implement subject to a working load could be substituted for the plow.

The implement attaching means M comprises a pair of lower draft links 10, each pivoted at 12 at its forward end to the tractor and each pivoted at 14 at its rear end to the plow. Because of the pivotal connections just described, the vertical position of the plow may be changed so that a pair of plow bottoms F may operate at any one of several selected working depths. The plow includes rigid mast structure 16 to the upper end of which is pivotally connected at 18 a forwardly extending top link 20 which comprises part of the attaching means M and which functions to operate a power unit L in response to changes in draft or working load on the plow.

The power unit shown here is of the hydraulically powered type comprising a tractor-mounted cylinder 22 within which a piston 24 is fluid-pressure operated to act through a piston rod 26 for rocking a tractor-mounted rockshaft 28 by means of an arm 30 connected to the piston rod 26 and rigidly secured to the rockshaft 28. In any of the well known designs, the power unit L, together with other components to be presently described, is carried in a secondary housing or casing, such as that shown at 32 in Fig. 1, provided as an integral part of the tractor. It will be appreciated that in the interests of clarity the several components as shown in Fig. 2 are somewhat separated from the relative positions that they would occupy in a commercial design. However, the functional relationship of the parts is adequately depicted for present purposes.

As part of the power unit L, the rockshaft 28 carries a pair of external arms 34, and each arm is connected by a lift link 36 to the respective draft link 10. The arrangement is such that rocking of the rockshaft 28 will raise or lower the draft links 10, according to the direction of rocking of the rockshaft, and will therefore effect adjustment of the working position of the plow bottoms F.

A control valve assembly V is operated by a movable actuator 38 for controlling the power unit. The valve assembly includes an internal motor chamber 40 that is selectively connectible with a motor line 42 and an exhaust line 44 respectively by means of spring-loaded high-pressure and exhaust poppet valves 46 and 48.

A pump 50 supplies fluid under pressure to the motor chamber 40 when the high pressure poppet valve 46 is opened. Although any type of control system could be used, that shown is of the closed-center type (constant pressure-variable volume), enabling the use of the poppet valve arrangement illustrated. The details could, however, be varied to suit the individual.

The actuator 38 is pivoted at 52 on the valve assembly V so as to be selectively rockable in opposite directions, thereby acting against the stem of one or the other of the poppet valves to open that poppet valve exclusively of the other. For example, when the actuator 38 is moved in a clockwise direction, it acts against the stem of the high-pressure poppet valve 46, opening that valve so that fluid under pressure is supplied to the left-hand end of the piston 24, moving the piston to the right and rocking the rockshaft 28 in a clockwise direction so as to effect raising of the plow P. During that phase of operation, the spring behind the poppet valve 48 keeps that valve closed. Conversely, when the actuator 38 is moved to rock in a counterclockwise direction, it depresses the stem of the poppet valve 48, opening that valve and permitting fluid to exhaust from the left-hand end of the piston via the motor line 42, motor chamber 40 and exhaust line 44. When the actuator 38 depresses the poppet valve 48, the high-pressure poppet valve 46 is closed by its spring.

Initial operation of the actuator 38 is effected by a hand lever 54, appropriately pivoted at 56 to a portion of the casing 32 and movable in an arcuate range determined by a sector 58. As is conventional, the selected position of the lever 54 is maintained by friction or other appropriate engagement with the sector. A depth stop 60 adjustable along an arcuate slot in the sector is an added convenience for the operator.

The valve actuator 38 and accordingly the valve V is under control of a motion-transmitting system comprising three elements interconnected by servo means S. The first is the hand lever 54. The second is a position responder in the form of an arm 62 on the rockshaft 28. And the third is a load responder operated by draft or load on the plow P via the top link 20 and including a fore-and-aft shiftable load responder rod 64.

The rod 64 is slidable in an internal housing 66 within which is contained a load or draft spring 68 that acts against a collar 70 fixed to the rod 64. The rear end of the rod projects through the rear wall of the tractor body or housing and is engaged by one arm of a lever 72. This lever is pivoted intermediate its ends at 74 and is connected at its lower end to the top link 20 and is opposed at its upper end by a secondary spring 76. As is well known, increase in draft or load on the plow P causes clockwise pivoting thereof about the pivot 14, followed by compressive forces in the top link 20 which tend to rock the lever 72 in a counterclockwise direction about its pivot 74 so as to shift the load responder forwardly against the bias of the spring 68, reflecting plus load values. In some circumstances, the load on the implement will be so light that there will actually be tensional forces in the top link 20. For this reason, the secondary spring 76 is interposed in the system to balance minus load values. However, the specific details in this respect are of no moment, except to note that plus and minus load values respectively cause forward and rearward displacement of the load responder.

The three elements 54, 62 and 64 are interconnected by the servo means S and other means to be presently described. The servo means includes first and second levers or input elements 78 and 80 having a pivotal interconnection 82 combining pivot and slot means to be described below. The first lever 78 has a force-receiving pivotal connection 84 with the front end of the load responder 64 and the second lever 80 has a force-receiving pivotal connection 86 with the position responder 62 by means of an intervening link 88. In general, the arrangement is such that movement of the load responder 64 causes rocking movement of the lever 78 about the pivotal interconnection 82 and movement of the position responder 62 causes rocking of the lever 80 about the pivotal interconnection 82.

The two levers are associated with an adjustable member 90 that is carried by the tractor for adjustment radially as respects the pivotal interconnection 82. In the preferred form of the invention, the member 90 is fixed to the rear end of a forwardly extending rod or link 92 which has its forward end pivotally connected at 94 to the hand lever 54. Lock nuts 96 are provided in the connection between the member 90 and the rod 92 for varying the length of the two components. Supporting of the member 90 on the tractor occurs via the rod 92 and a collar 98 in which the rod is slidable. The collar 98 is carried by selector means including an internal selector arm 100 and this arm is controlled externally of the casing 32 by an external selector arm 102 and an interconnecting rockshaft 104. By means of a detent or other suitable releasable locking device (not shown), the selector arm 102 is capable of assuming any one of several positions spaced angularly about the rockshaft 104, these positions being indicated generally by the letters A, B, C, D and E. When the selector arm 102 is in any selected position, the collar 98 is temporarily fixed and provides a bearing in which the rod 92 is slidable, so that the rod 92 may be moved back and forth by manipulation of the hand lever 54.

The member 90 has thereon a laterally outwardly projecting pin 106 which affords a fulcrum for the servo means. Adjustment of the selector lever 102 among its positions A, B, C, D and E of course varies the relationship of the fulcrum 106 to the pivotal interconnections 84 and 86. For this purpose, the lever 80 has therein and lengthwise thereof a slot 108 in which the fulcrum pin 106 is received. The member 90 extends beyond the lever 80 and carries a retaining pin 110 which holds a spring clip 112 engaged against the left-hand or rear edge of the lever 80. The spring clip serves as means for taking up the slack between the fulcrum pin 106 and the slot 108.

The lever 80 has a laterally offset portion 114 (Fig. 3) which carries a fulcrum or pivot pin 116 as part of the pivotal interconnection 82. This pin is slidably received in a slot 118 that extends lengthwise of the lever 78 from a point intermediate the ends of the lever to a point adjacent to the top end of the lever, at which end the lever has a rearwardly projecting portion 120 by means of which a pivotal connection is effected at 122 to an output element actuator link 124 for rocking the actuator 38. An extension of the portion 114 on the lever 80 carries a retaining pin 126 which carries a spring clip 128 in frictional engagement with the lever 78, and the pin 126 also affords a connection for the upper end of a light tension spring 130, the lower end of which is connected at 132 to the front end of the load responder 64. The spring clip 128 serves as means for taking up slack between the pin 116 in the slot 118. The spring 130 biases the pin 116 toward the bottom of the slot and also stabilizes the servo means by biasing the levers 78 and 80 for pivoting relative to each other about the pivot 116 so that the point 116 tends to move rearwardly, or to the left as viewed in Fig. 2.

The connection of the internal selector arm 100 to the collar 98 includes a pivot 134 so that supporting of the rod 92 by the selector 100 combines pivotal and sliding movement.

As will be seen, the selector means 100, 102 and 104 is an adjustable tractor-mounted support for the member 90, and comprises adjusting means for the change-effecting means made up of the member 90 and the slotted portions of the levers 78 and 80, whereby the responsiveness of the motion-transmitting system to movement of the responders can be varied at will. When the selector means is moved among positions A, B, C, D and E, the position of the fulcrum pin 106 changes radially as respects the pivotal interconnections 82, 84 and 86. At the same time, the member 90 is movable fore-and-aft or in the directions of rocking of the levers 78 and 80 so that both levers are moved simultaneously about their respective pivotal connections 84 and 86, the control lever 54 comprising a manual control member for this purpose. Hence, the member 90 is under control of the two members 54 and 102. As will be brought out below, the adjustment of the member 90 relative to the servo means in a direction radially as respects the various fulcra varies the effective moment arms acting on each other as well as on the actuator 38.

*Operation (Figs. 1–5)*

The system provided according to the design just described affords, selectively, load control, position control and position-compensated control in various degrees. When the system is operating in load or draft control (Fig. 2) it has all the advantages of any draft control system. Likewise, when it is operating in position control (Fig. 5) it has all the advantages of any position-responsive system. In addition, the selector may be positioned at B, C or D and give proportionately combined advantages of both systems.

In the immediately following description, reference will be had primarily to Figs. 1, 2 and 3. A comparison of Figs. 2 and 3 should be made at this point in the interests of clarity. In a theoretically perfect design, the pivots or fulcra 106 and 116 when relatively positioned as in Fig. 2, should be coaxial, as shown in Fig. 3. However, for the purposes of the schematic illustration in Fig. 2, the two pivots are illustrated as being offset so that both of them can be readily seen and their functions thus more readily appreciated. Actually, however, because of the slot 118 and the very small moment arm involved as between 106 and 116, the offset is negligible and will not affect the ensuing description.

If the plow is in full-raised position, the manual control member or lever 54 will be in its rearward most position. When the operator desires to lower the plow to its working position, he moves the lever 54 forwardly. The selector means is in position A (Fig. 2) and the collar 98 supports the rod 92 for forward sliding movement. As the lever 54 is moved forwardly or in a clockwise direction, the rod 92 pulls on the member 90 and this member, through the medium of the fulcrum pin 106, rocks the lever 80 forwardly about its fulcrum 86 and simultaneously rocks the lever 78 forwardly about its fulcrum 84, the lever 78 moving with the lever 80 because of the pivot connection 116. In other words, the two levers tend to buckle in a forward direction as they follow the member 90. As the upper end of the lever or input element 78 moves forwardly, it carries with it or drives the link 124 and imparts a counterclockwise rotational movement to the actuator 38, followed by lifting of the exhaust poppet valve 48 against it biasing spring and allowing fluid under pressure to exit through the exhaust line 44 as the plow descends. As the tractor and plow move forwardly, the plow bottoms F enter the ground and ultimately operate at a draft or load which will be balanced against the spring 68 as determined by the position of the control lever 54 as is conventional. As draft load of a plus value is applied to the load responder 64 through the top link 20, the load responder 64 tends to move forwardly, delivering force to the lever 78 via the pivotal connection 84 and causing the lever 78 to swing in a counterclockwise direction about the fulcrum 116 so as to exert a rearward force through the link 124 to the actuator 38. This rocks the actuator 38 in a clockwise direction and relieves the lifting effect on the exhaust valve 48, whereupon the spring behind that valve returns the valve to neutral; and, if the draft load remains constant, the bottoms F will plow at a uniform depth.

In the event that increased soil density is encountered, the draft load will increase, causing a forward thrust on the top link 20 to compress the spring 68 and thus to move the load responder 64 forwardly. Again, the lever 78 is rocked in a counterclockwise direction about the fulcrum at 116 and the top end of the lever applies a rearward force to the actuator 38 via the link 124 to rock the actuator in a clockwise direction for lifting the high-pressure poppet valve 46 so as to admit fluid under pressure from the pump 50 to the cylinder 22 via the motor line 42. The plow will then be raised by the power unit L until the draft load attains its predetermined value.

During raising and lowering of the plow, the rockshaft 28 will of course rock in one direction or the other. Since the position responder 62 is fixed to the rockshaft 28, the position responder will transmit motion to the lever 80. However, this motion will have no effect on the actuator 38, since the fulcrum for the lever 80 will be the pivot pin 106 and the effective moment arm capable of acting on the actuator via the other lever 78 will be the distance between the pivot pins 106 and 116. As shown in Fig. 2, these pins are in fore-and-aft alinement and the moment arm is negligible. In a theoretically perfect design, as explained above, in which the pins 106 and 116 are coaxial (Fig. 3), the moment arm will be zero. Hence, when the system is operating in load control (Fig. 2, position A) it will have zero position responsiveness.

Fig. 5 illustrates the servo means and its related parts in a position in which the system is entirely position-responsive. That is to say, draft or load changes will have no effect on the system. To achieve this position the selector 102 is moved from position A (Fig. 2) to position E (Fig. 5). When so moved, the internal selector arm 100 carries the collar 98 and accordingly the rod 92 and member 90 to its highest position. As the member 90 is moved to this position, its pin 106 first travels to the upper end of the slot 108 and then picks up the lever 80, carrying the lever 80 with it. As the lever 80 moves upwardly with the member 90, its pin 116 travels to the top end of the slot 118 in the lever 78.

When the system is in the Fig. 5 position, the position of the plow will be proportional to the position of the control lever 54 as in any position-responsive system. For example, when the operator desires to lower the plow, he moves the control lever 54 forwardly, exerting a forward force on the link or rod 92 which causes a forward or counterclockwise swinging of the top lever 80 about its pivot at 86 to the link 88 and simultaneously, via the pin 116, causing a forward or clockwise swinging of the lever 78 about the point 84 as a fulcrum. This exerts a forward force on the actuator link 124 and rocks the actuator 38 in a counterclockwise direction to open the exhaust valve 48. Thereupon, fluid in the cylinder 22 may exit through the line 42, chamber 40 and line 44 as the plow descends under its own weight. As the plow descends, the rockshaft 28 rocks in a counterclockwise direction and the position responder pulls forwardly on the link 88 so as to rock the lever 80 in a clockwise direction about its fulcrum 106. The effective moment arm on the lever 78 is determined by the distance between the pins 106 and 116, from which it will be seen that, as the lever 80 rocks in a clockwise direction, the pin 116 causes the lever 78 to rock rearwardly about its pivot 84, thus reversing the movement of the actuator 38 as the link 124 operates in compression to move the actuator in a clockwise direction to allow the exhaust valve 48 to seat. If, when the adjustment of Fig. 5 is accomplished, the plow encounters soil of increased density, for example, so as to increase the draft load thereon, the effect of the additional load will be ignored by the system, since the compressive forces transmitted through the top link 20 to the load responder 64 rock the lever 78 idly about the point 116, the moment arm between 122 and 116 and the direction of movement of 122 being negligible. In brief, the position-responsive system operates without being influenced in any respect by changes in draft load.

From the description thus far, it will be seen that the system gives two types of control, according to the nullification of the effect of one or the other of the levers 78 or 80. That is to say, in load control (Fig. 2, position A), movement of the lever 80 is without effect on the actuator 38 and the system performs in a first status or condition of full and exclusive responsiveness to the load responder. In position control (Fig. 5, position E) movement of the lever 78 by the draft responder 64 is without effect on the actuator 38, in which case the second status or condition of the system is one of full and exclusive responsiveness to the position responder. To the extent described, the system in either of the positions of Figs. 2 or 5 gives the usual benefits of the two types of control. However, the invention has an added feature, enabling operation of the system in a third status and in variants thereof involving intermediate ranges of control combining or partaking combinatively of movement of both responders and deriving benefits from the combination.

Fig. 4 shows the compound servo mechanism in an intermediate position, the selector lever 102 having been set in position C to adjust the fulcrum 106 to the top end of the slot 108 in the lever 80. The fulcrum or pivot 116 remains at the bottom of the slot 118 in the lever 78. Initial operation of the valve actuator 38 by the manual control lever 54 remains as before. However, restoration of the valve to neutral is influenced by the movement of either or both of the levers 78 and 80. For example, if the outfit is plowing at a selected depth and the draft load increases, the load responder 64 shifts forwardly, causing the lever 78 to fulcrum about the pivot pin 116 so that the upper end of the lever 78 acts through the link 124 to rock the actuator 38 in a clockwise direction about its pivot 52. This lifts the high-pressure poppet vave 46 to admit fluid under pressure to the left-hand end of the cylinder 22. As the lift unit operates to raise the plow, the rockshaft 28 rotates in a clockwise direction and the position responder 62 acts through its link 88 to swing the lever 80 in a counterclockwise direction about its fulcrum 106. The lower end of the lever 80 acts through its pivotal connection 116 to the lever 78 to swing the lever 78 forwardly about its pivot 84. The top end of the lever 78 thus acts through the link 124 to rock the actuator 38 in a counterclockwise direction so that the poppet valve 46 is permitted to close. The result of this action is that the poppet valve 46 closes sooner than it would were it directly under control of the load responder. Accordingly, the plow bottoms F will plow at a new depth but at a draft load greater than that initially selected but less than that that caused operation of the system in the first place. Therefore, the plowing operation will be carried out with smaller increments or changes in plowing depth. That is to say, the furrow bottom will be more nearly uniform than it would be with straight draft control.

The operator may, according to soil conditions and the like, select one or the other of the intermediate positions (B or D) and may thus vary the effective moment arms acting on the compound servo means. For example, if the selector 102 is set at position B, the fulcrum 106 will be moved approximately half way up the lever slot 108. If the selector is set in position D, the fulcrum 106 will move first to the top end of the lever slot 108, picking up the lever 80, and then the fulcrum 116 will move half way up the lever slot 118 in the lever 178. An infinite number of positions could be provided if desired.

Figs. 6, 7 and 8

These figures show the use of the previously described system in a tractor in which the draft control mechanism is modified, the essential difference in the draft control residing in the use of a simple resilient metallic bar 68a in place of the load control 68, as disclosed in assignee's copending application Serial No. 730,743 filed April 16, 1958. The feature of this construction is that the bar 68a is supported in the tractor body at laterally spaced apart portions of fulcra 136 and opposite ends of the bar project laterally respectively from opposite sides of the tractor to provide pivots at 12a for the forward ends of the draft links 10. As shown in Fig. 6, the forward end of the top link 20 is simply pivoted to the tractor 74a. In other words, the draft or load system here operates on the basis of tensional forces in the lower links 10 rather than on the basis of compressive forces in the top link 20, as in copending application Ser. No. 513,352, filed June 6, 1955. When draft load increases, the tension in the lower links 10 causes the intermediate portion of the bar 68a between the fulcra 136 to bend forwardly to exert its influence on a signal member 64a which is pivoted at 70a to the bottom of the tractor body. The upper end of the member 64a is pivoted to the servo lever 78 by the pivot 84. The tension spring 130, previously described in connection with Figs. 1 through 5, is connected to an offset arm portions 132a on the lever 64a. In other respects, the control system is identical to that described above. A tension spring 138 is connected between an upper portion of the signal member 64a and a suitable attaching point 140 on the tractor. As will be seen, increases in draft load cause forward movement of the upper end of the signal member 64a, which movement corresponds to the movement of the load responder 64 in Figs. 1 through 5.

Each of the opposite ends of the bar 68a is associated with an external bracket 142 in which an aperture 144 is formed. This aperture is of sufficient size to permit fore-and-aft movement of the end of the bar in bending as draft load varies. A pin 146 passed through the end of the bar is received in a groove 148 in the bracket 142, so as to prevent angular displacement of the bar 68. Spacers 150 are interposed between the draft links 10 and respective sides of the tractor to hold the lateral positions of the links 10.

Summary

The operation of the arrangement in Figs. 6, 7 and 8 is assumed to be clear from the description of the operation of the system shown in Figs. 1 through 5. In both arrangements, the compound servo means S is readily adapted to the two types of load control mechanisms, Figs. 1 through 5 showing the adaptation of the servo means to a somewhat conventional system and Figs. 6 through 8 showing the control adapted to a modified system, thereby illustrating the versatility of the servo means. The servo means itself is of relatively simple construction and the various adjustments are easily effected.

Other features of the invention, not categorically enumerated, will occur to those versed in the art, as will many modifications and alterations in the preferred embodiments disclosed, all of which may be achieved without departing from the spirit and scope of the invention.

What is claimed is:

1. In a tractor having means for the adjustable attachment of an implement thereto, a power unit on the tractor for adjusting the working position of the implement, an actuator for controlling the power unit, a position responder movable by the power unit in accordance with adjustment of the implement, and a load responder movable by the implement in accordance with changes in implement working load, the improvement comprising: first and second levers having a pivotal interconnection with each other and each having a force-receiving pivotal connection with a responder in radially spaced relation to said pivotal interconnection so that movement of either responder alone rocks its lever about said pivotal interconnection; a force-transmitting member connected to the actuator and to the first lever in radially spaced relation to the pivotal interconnection for effecting movement of the actuator by rocking of said first lever; an adjustable member on the tractor and having a fulcrum rockably supporting the second lever; and means for adjusting the adjustable member selectively radially toward and away from the pivotal interconnection of the levers to each other and thereby to vary the effective moment arm by which the second lever acts on the first lever.

2. The invention defined in claim 1, including: a manual control member movable on the tractor; means mounting the adjustable member on the tractor for movement in the directions of rocking of the levers so that said adjustable member acts via its fulcrum to the second lever to move both levers about their respective pivotal connections to the responders; and means operatively connecting the manual control member to the adjustable member for moving said adjustable member.

3. The invention defined in claim 1, in which: the pivotal interconnection of the levers to each other is radially adjustable to vary the moment arm by which the first lever acts on the second lever.

4. The invention defined in claim 1, in which: the second lever has a slot therein extending generally radially as respects the pivotal interconnection of the levers to each other; and the fulcrum on the adjustable member is selectively positionable at different positions along said slot to vary the aforesaid moment arm.

5. The invention defined in claim 4, in which: the pivotal interconnection of the levers to each other includes a pivot pin carried by the second lever and a slot formed in the first lever and extending generally radially in the same direction as the slot in the second lever, said pin being adjustably positionable at different positions along said first lever slot to vary the moment arm by which the first lever acts on the second lever.

6. In a tractor having means for the adjustable attachment of an implement thereto, a power unit on the tractor for adjusting the working position of the implement, an actuator for controlling the power unit, a position responder movable by the power unit in accordance with adjustment of the implement, and a load responder movable by the implement in accordance with changes in implement working load, the improvement comprising: a first lever having a force-transmitting connection at one end to the actuator and a pivotal force-receiving connection at its other end to one responder, said lever having a slot therein extending lengthwise thereof from said one end toward said other end; a second lever having one end proximate to the midportion of the first lever and extending beyond said one end of the first lever to a pivotal force-receiving connection with the other responder, said second lever having at its said one end a pivot pin received in and selectively positionable along the first lever slot toward and away from the connection of said first lever to the actuator, said second lever further having a slot therein extending from its said one end toward its pivotal connection with said other responder; an adjustable tractor-mounted fulcrum received in said second lever slot; and means mounting the fulcrum for selective positioning along said second lever slot to rockably support said second lever at any one of several selected pivot points.

7. In a tractor having means for the adjustable attachment of an implement thereto, a power unit on the tractor for adjusting the working position of the implement, an actuator for controlling the power unit, a position responder movable by the power unit in accordance with adjustment of the implement, and a load responder movable by the implement in accordance with changes in implement working load, the improvement comprising: a first lever having a force-transmitting connection at one end to the actuator and a pivotal force-receiving connection at its other end to one responder, said lever having a slot therein extending lengthwise thereof from said one end toward said other end; a second lever having one end proximate to the midportion of the first lever and extending beyond said one end of the first lever to a pivotal force-receiving connection with the other responder, said second lever having at its said one end a pivot pin received in and selectively positionable along the first lever slot toward and away from the connection of said first lever to the actuator, said second lever further having a slot therein extending from its said one end toward its pivotal connection with said other responder; a control member movable selectively back and forth in a control path generally parallel to the planes of rocking of the levers; a tractor mounted support carrying the control member for movement as aforesaid; a fulcrum on the control member and received in the second lever slot so that back and forth movement of the control member rocks said second lever about the pivotal connection thereof with its responder and said second lever acts through its pivot pin to rock the first lever about the pivotal connection thereof to its responder and thereby to move the actuator; and means mounting the tractor-mounted support for movement lengthwise of the lever slots for selectively positioning the fulcrum in the second lever slot, said mounting means being arranged so that initial movement of the control member lengthwise of the slots carries the fulcrum to the end of the second lever slot remote from the pivot pin and subsequent movement of said control member lengthwise of the slots picks up and moves said second lever so as to move the pivot pin to the end of the first lever slot proximate to the connection of said first lever to the actuator.

8. In a tractor having means for the adjustable attachment of an implement thereto, a power unit on the tractor for adjusting the working position of the implement, an actuator for controlling the power unit, a position responder movable by the power unit in accordance with adjustment of the implement, and a load responder movable by the implement in accordance with changes in implement working load, the improvement comprising: a motion-transmitting system including a pair of intergaged lever elements interconnecting the actuator and both responders and arranged to operate the actuator in accordance with movement of the responders; adjustable means for changing the interengaged relation of the lever members and thereby effecting changes in the motion-transmitting characteristics of the system to vary the amount of responsiveness thereof to movement of the responders among a first status of full and exclusive responsiveness to movement of the load responder, a second status of full and exclusive responsiveness to movement of the position responder and a third status of partial responsiveness to movement of both responders; and means for adjusting said change-effecting means.

9. In a tractor having means for the adjustable attachment of an implement thereto, a power unit on the tractor for adjusting the working position of the implement, an actuator for controlling the power unit, a position responder movable by the power unit in accordance with adjustment of the implement, and a load responder movable by the implement in accordance with changes in implement working load, the improvement comprising: a motion-transmitting lever and link system interconnecting the actuator and both responders and including fulcrum means and a pair of lever elements interengaging at said fulcrum means to afford a pair of moment arms respectively engageable by and deriving motion from the responders, said fulcrum means and moment arms being relatively adjustable to vary the effective lengths of the moment arms for selectively establishing responsiveness of the actuator to either responder exclusively of the other responder or to a combination of both responders; and means for relatively adjusting the fulcrum means and moment arms.

10. In a tractor-connected implement including a power unit for adjusting the implement as to position and working load and an actuator for energizing and deenergizing said power unit, the improvement comprising: a selectively positionable main control means; a position responder movable according to the position of the implement; a load responder movable according to working load on the implement; a motion-transmitting system including a portion interconnecting the actuator and the main control means for causing the actuator to energize and deenergize the power unit by positioning of said control means whereby the actuator is operative by said control means to initially energize the unit to select a position and a working load for the implement; said system including a first follow-up connection between the actuator and the position responder operative to cause the actuator to deenergize the power unit when the selected position is attained; said system including a second follow-up connection between the actuator and the load responder for causing the actuator to deenergize the power unit when the selected working load is attained and for causing the actuator to reenergize the power unit when the working load on the implement varies from that selected; said system further including adjustable means interconnecting the first and second follow-up connections and alternately settable in either of two extreme settings for effectuating either connection exclusively of the other and in an intermediate setting effectuating both connections for cooperative effect on the actuator; and selector means independently of the main control means and connected to the adjustable means for selectively incurring said extreme and intermediate settings of said adjustable means irrespective of the position of the main control means.

References Cited in the file of this patent

UNITED STATES PATENTS

| | | |
|---|---|---|
| 2,631,515 | McRae | Mar. 17, 1953 |
| 2,715,863 | Bunting | Aug. 23, 1955 |
| 2,722,873 | Garmager | Nov. 8, 1955 |
| 2,722,874 | Bopf | Nov. 8, 1955 |

FOREIGN PATENTS

| | | |
|---|---|---|
| 1,075,023 | France | Apr. 7, 1954 |
| 728,858 | Great Britain | Apr. 27, 1955 |